United States Patent [19]

Steffen et al.

[11] 4,175,418

[45] Nov. 27, 1979

[54] TEMPERATURE MONITORING AND TEMPERATURE DIFFERENTIAL CONTROL DEVICE

[75] Inventors: Sylvester L. Steffen, R.R. 3, New Hampton, Iowa 50659; Duaine L. Bollwitt, Monticello, Iowa

[73] Assignee: S. L. Steffen, New Hampton, Iowa

[21] Appl. No.: 903,815

[22] Filed: May 8, 1978

[51] Int. Cl.² ............................................. G01K 1/00
[52] U.S. Cl. .................................................... 73/342
[58] Field of Search ........................ 73/342, 340, 341; 34/48, 54

[56] References Cited

U.S. PATENT DOCUMENTS

| | | | |
|---|---|---|---|
| 3,526,968 | 9/1970 | Triplett | 34/48 |
| 4,053,991 | 10/1977 | Steffen | 34/54 |
| 4,112,589 | 9/1978 | Palfrey et al. | 34/48 |

*Primary Examiner*—Donald O. Woodiel
*Attorney, Agent, or Firm*—Henderson & Sturm

[57] ABSTRACT

An electronic device is provided for use in monitoring and controlling the curing of live food products, specifically grain, in a storage environment. The device includes a first temperature sensing unit, a second temperature sensing unit, a comparator unit, a temperature differential comparator unit and a load switch responsive thereto, and a digital display unit for displaying the monitored temperatures and temperature differentials.

15 Claims, 7 Drawing Figures

TEMPERATURE MONITORING AND TEMPERATURE DIFFERENTIAL CONTROL DEVICE

BACKGROUND OF THE INVENTION

The present invention relates to an automatic temperature control circuit for use in after-harvest-management of wet-stored grains. More specifically, it monitors energy exchanges which occur between living seeds and their environment as they go through their natural cycle of curing.

As taught in U.S. Pat. Nos. 3,408,747; 4,045,878; and 4,053,991, optimum moistures in grain vary with grain temperatures. In U.S. Pat. No. 4,045,878 it is taught that these conditions of moisture contribute to the curing process, which includes biochemical restructuring of the seed as it goes through its ripening process. Environmental conditions of temperature/humidity interact with the seeds to influence these processes; and in a closed storage environment, adverse conditions will rapidly develop unless indicators and controls are used to monitor conditions and to permit activation of air controlling means (humidity and volume) to remove the adverse conditions.

In U.S. Pat. No. 3,408,747, a method and arrangement of structures are taught which permit management responses according to conditions of grain volume, air volume and temperatures during the ventilation and drying of grain so as to minimize adverse biochemical changes in the seed, and which, in conjunction with a grain moisture chart, make possible the indication of grain moisture by comparing the in-going air temperature (dry-bulb) against the out-going air temperature (wet-bulb).

This same patent teaches a temperature ceiling under which heat additions should be kept when used in drying grain, and specifies the criticalness of air temperature and air volume for optimum conditioning of grain.

Because of the stabilizing effect of cooling, significant reductions in ventilation are permissible. In other patents cited, "unheat curing" or removal of "free heat" from atmospheric air so as to reduce the seed temperatures to lowest possible levels given atmospheric conditions is taught. In grain, least deterioration occurs at lowest temperatures; which is to say that optimum quality in grain is achieved when grain is reduced to a least energy state by using atmospheric air to reduce the energy state (temperature) of grain when its temperature is higher than the atmospheric air, and on a continuing basis to be able to monitor and control moisture removal from the grain environment by monitoring heat-loss during ventilation.

"Curing" of grain is new art in the field of managing grain and is not to be confused with "drying". Drying is simply removal of water from grain in structures which use arbitrary levels of heat and air as determined by the mechanical engineering design of the structure. "Curing", on the contrary, relates to a process which includes optimizing biochemical changes in the product being cured. Because grain releases moisture to the surrounding air as it cures, drying of the product also occurs. The instant teaching is one that avoids heat applications which removes moisture from grain at a rate faster than occurs in the atmospheric environment.

This invention relates to a monitor and control which senses energy-exchanges (heat) as they occur between living seed and the atmosphere, and which controls the activation of air controlling means, e.g., infrared emitters and/or fans in response to evaporative cooling.

Energy radiation from the sun charges atmosphereic air with energy. Varying amounts of "free heat" are available in atmospheric air and are measurable in evaporative cooling. The "mean wet-bulb temperature" indicates the "free heat" available to grain in open air curing.

U.S. Pat. Nos. 3,408,747 and 4,045,878 identify a "dormancy index" or equilibrium moisture and temperature in grain in response to average, atmospheric conditions.

This invention allows selective control of activation of dehumidifiers when the wet-bulb depression is less than the mean, wet-bulb depression in the geographical area applicable, and deactivation of dehumidifying apparatus when evaporative cooling exceeds the mean, wet-bulb depression.

U.S. Pat. No. 3,408,747 teaches a static psychrometer including structure (perforated floor) for allowing air to escape from the air plenum; a wetted member (grain) exposed to the escaping air; temperature sensors giving the temperature of the air before being exposed to the wetted member and again after being exposed to the wetted member, and a pre-composed grain moisture chart identifying equilibrium-grain-moisture to the two temperature readings obtained.

The instant invention describes a solid state structure capable of continually displaying at ground level on a digital display the in-going air temperature and the out-going temperature of the differential therebetween, and a solid state structure which activates and deactivates air modifying means in response to the differential temperature regardless of fluctuations in atmospheric air temperature.

In U.S. Pat. No. 3,408,747 the criticalness of air volume and air temperature is noted as well as their interaction with grain of varying moisture contents. These critical relationships must be maintained if seed-life is to be preserved. Because of changes resulting from interactions, i.e., adding of grain and/or colder temperatures, some means for constantly monitoring air quantity (volume) and air quality (temperature) is essential. The monitoring device employed for measuring air volume is a conventional manometer mounted on the plenum wall, used with fans of known air deliveries at specific pressures (inches displacement of water). By maintaining a consistent relationship of fan horsepower to bushels of grain, e.g., 1 horsepower per 1,000 bushels of grain, and by keeping grain depths the same in all situations, i.e., never exceeding 14', the volume of air to the grain will basically be the same in all structures at a given depth, and the pressure will essentially be the same. Maximum pressure is observed in the plenum into which air is being introduced. The pressure in the grain column decreases the further the distance from the plenum, so that least pressure is in the exhaust plenum, which may or may not be atmospheric air pressure.

For optimum use of air, it is desirable to bring it to a maximum level of moisture carrying capacity consistent with a moisture level not hazardous to the grain. Thus, it is useful to be able to monitor the humidity condition of air and to increase the ventilation rate and/or increase the moisture-holding capacity of air when the humidity is too high.

SUMMARY OF THE INVENTION

Therefore, it is an object of this invention to provide an automatic monitor and control device for use in the curing of grain which monitors the expenditure of heat from atmospheric air as it passes through a bed of stored grain and to control air modification apparatus in response to the sensed heat-loss.

It is another object of this invention to provide an automatic monitor which displays the dry-bulb temperature, wet-bulb temperature and wet-bulb temperature depression and which controls dehumidification apparatus in response to the sensed wet-bulb depression when the wet-bulb depression is less than the control setting.

It is another object of this invention to provide an automatic monitor and control device for use in the curing of bulks of stored grain without additions of heat that would cause unacceptable warming in the grain.

It is an object of this invention to provide a control which permits curing of grain at least atmospheric temperatures so as to optimize the energy-level, weight and nutritional value of grain.

It is yet another object of this invention to provide an automatic monitor and control device for use in the curing and drying of grains that will provide a visual display of the monitored temperatures in degrees Farenheit throughout the curing and/or ventilation of the grain.

It is another object of this invention to provide an automatic monitor and control device for use in management of stored grain that is easily calibrated to compensate for variances in manufactured electrical components and thereby provide accurate control.

It is still another object of this invention to provide an automatic monitor and control device for use in curing stored grain that allows the operator to select the desired web-bulb temperature depression at which he wishes the control to be responsive.

It is yet still another object of this invention to provide an automatic monitor and control device for use in grain curers that is relatively inexpensive to manufacture, durable of construction and highly effective in use by virtue of energy-conservation and grain preservation.

These and other objects are realized by an electronic device for use in temperature monitoring and temperature differential control in the curing, drying and management of stored grain. The device includes a first temperature sensing device and a second temperature sensing device, a comparator device, a temperature differential comparator device and a load switch responsive thereto, and a digital display device for displaying the monitored temperatures and temperature differential.

DESCRIPTION OF THE PREFERRED EMBODIMENTS

Figure 1:
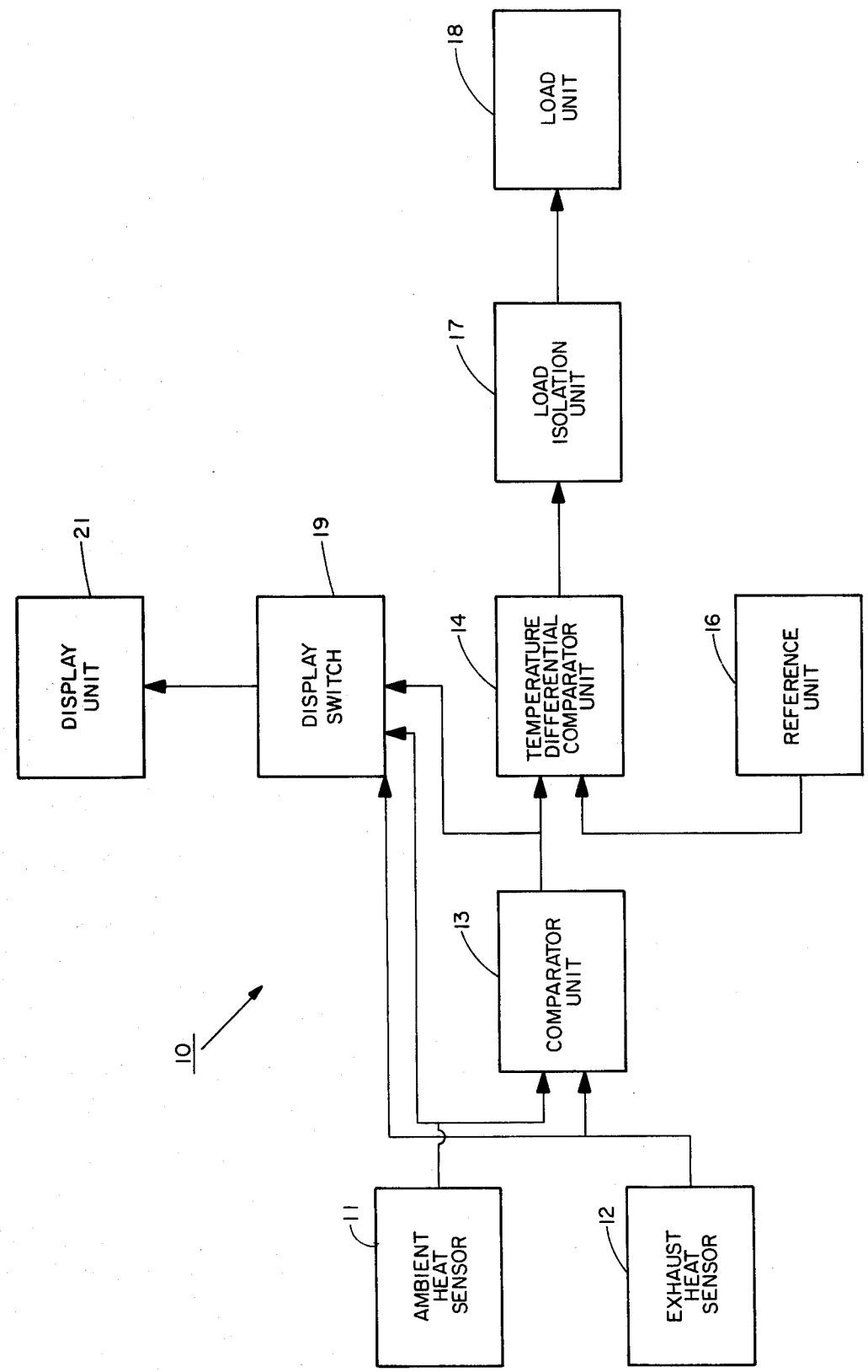
FIG. 1 is a block diagram of the device.

Referring now to the drawings, and in particular to FIG. 1, the device may be seen generally in block diagram form as denoted by the numeral 10. Specifically, the device 10 includes an ambient heat sensor 11, an exhaust heat sensor 12, a comparator unit 13, a temperature differential comparator unit 14, a reference unit 16, a load isolation unit 17, a load unit 18, a display switch 19 and a display unit 21. A power supply unit 22 is also included as disclosed in FIG. 3.

Figure 2:
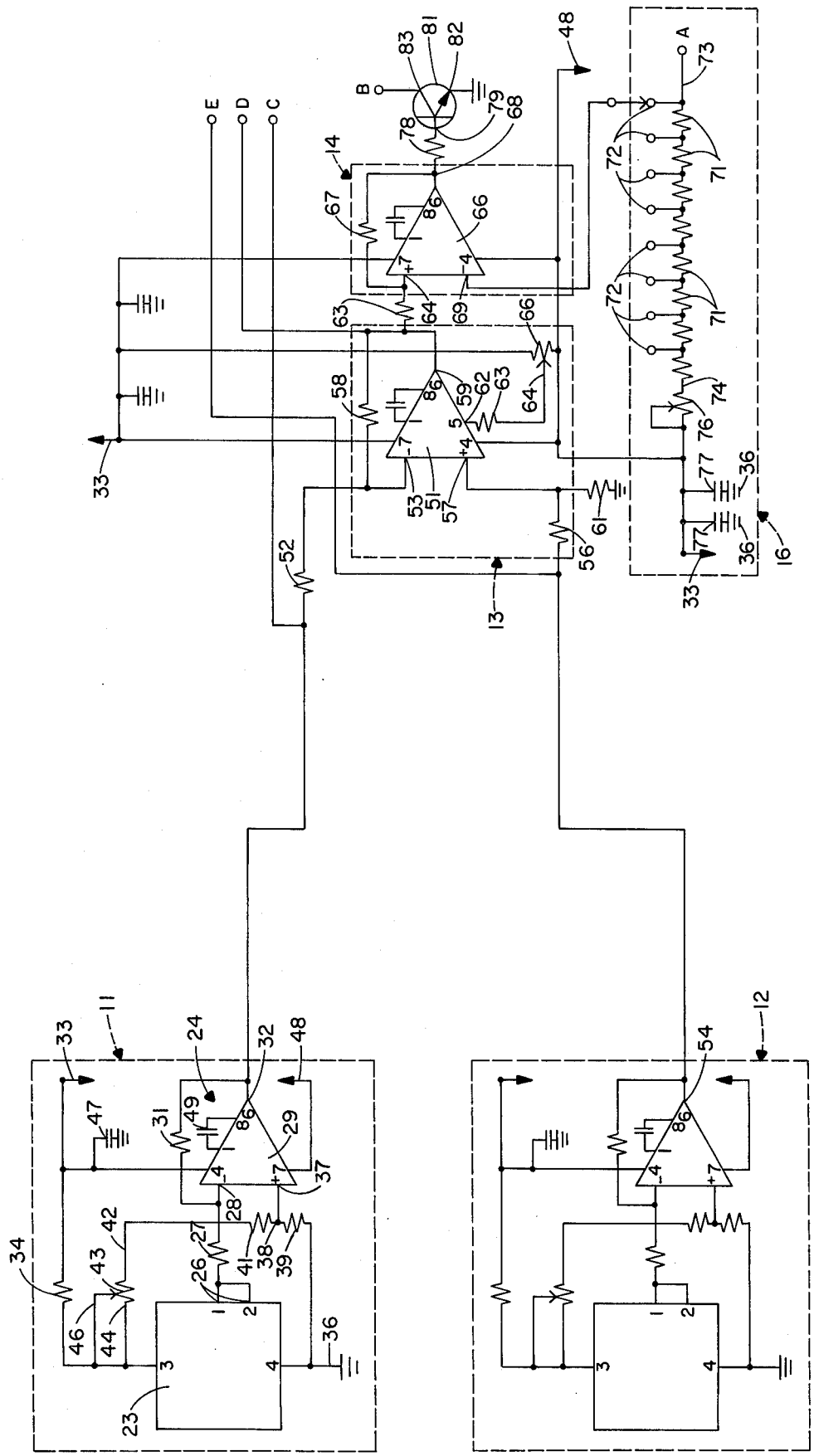
FIG. 2 is a partial schematic view of the device detailing the exhaust heat sensor, the ambient heat sensor, the comparator unit, the reference unit, and the temperature differential comparator unit.

With reference to FIG. 2, the ambient heat sensor 11 includes generally a temperature transducer unit 23 and a Kalvin-to-Fahrenheit conversion unit 24. The temperature transducer unit 23 (in this embodiment an LS 5600 was used) exhibits a variance in the output voltage in response to a variance in the environmental temperature proximate the temperature transducer 23. This voltage variance has been calibrated such that the temperature transducer 23 produces an output voltage commensurate to the temperature in degrees Kalvin. Both input and output 26 of this particular temperature transducer unit 23 are electrically connected one to the other and by a first resistor 27 to the inverting input 28 of a first operational amplifier 29. A second resistor 31 provides negative feedback between the output 32 and the inverting input 28 of this operational amplifier 29, the resistor 31 having a value appropriate for producing a gain of 1.8 through the operational amplifier 29 and thereby forming the Kalvin-to-Fahrenheit conversion unit 24. It is this gain which results in a conversion of the Kalvin values from the temperature transducer unit 23 to degrees Fahrenheit. The components of the ambient heat sensor 11 are powered and biased in a known fashion by a +5 volt source and a −5 volt source, which sources will be fully described infra. To elaborate, pin 3 of the voltage transducer unit 23 is electrically connected to the −5 volt source 33 by a third resistor 34 and pin 4 of the voltage transducer unit 23 is electrically secured to ground potential 36. The non-inverting input 37 of the first operational amplifier 29 is conductively joined to the central node 38 of a voltage-divider network. The network includes a fourth resistor 39 having one lead conductively secured to ground potential 36 and a fifth resistor 41 having one lead conductively secured to the first lead 42 of a first variable resistor 43. The second lead 44 and the tap lead 46 of the variable resistor are connected to pin 3 of the voltage transducer unit 23. This variable resitor 43 is included to allow a precise calibration of the conversion unit 24, to insure correct temperature readings. Finally, pin 4 of the operational amplifier 29 is connected in parallel with a grounded capacitor 47 to the −5 volt source 33, and pin 7 is electrically connected to the +5 volt source 48. The capacitor 49 shown attached across pins 1 and 8 of the operational amplifier 29 is provided for any internal compensation that might be necesary, in accordance with standards and techniques well known in the prior art.

The exhaust heat sensor 12 includes precisely the same configuration of elements as the ambient heat sensor 11 disclosed above, and to avoid repetition, the detailed description of the latter shall serve as the description of the former, for the purposes of this disclosure. The distinction between the two sensors 11 and 12 exists in the positioning of the sensors; i.e., the ambient heat sensor 11 is positioned to sense the general ambient temperature of the air outside the grain curer, (not shown) and the exhaust heat sensor 12 is positioned to sense the temperature of the air exhausting from the grain (not shown).

A comparator unit 13 is provided to compare the temperature differential between the exhaust heat sensor 12 and the ambient heat sensor 11. The comparator unit 13 includes a second operational amplifier 51 and a number of resistive elements. The output 32 of the ambient heat sensor 11 is electrically connected by a 10,000 ohm resistor 52 to the inverting input 53 of the second operational amplifier 51 and the output 54 of the exhaust heat sensor 12 is electrically connected by a second 10,000 ohm resistor 56 to the non-inverting input 57 of the same operational amplifier 51. Negative feedback is provided by yet another 10,000 ohm resistor 58 connected between the output 59 and the inverting input 53 of the second operational amplifier 51. The non-inverting input 57 of the operational amplifier 51 is connected to a grounded 10,000 ohm resistor 61. Finally, a voltage divider network is connected to the offset-null input 62 of the second operational amplifier 51. Specifically, the offset-null 62 is electrically connected by a sixth resistor 63 to the tap lead 64 of a second variable resistor 66 that is biased between the +5 volt source 33 and the −5 volt source 48. As is well known in the prior art, operational amplifiers frequently emit an offset voltage even when there is no input signal. While this tendency is not critical in many applications, it is critical to the instant invention, where the device must track, detect and respond to small temperature differentials. Therefore, the voltage divider network is provided to bias the offset-null 62, in order to calibrate the offset voltage to zero.

The output 59 of the comparator unit 13 is connected to a temperature differential comparator unit 14. Specifically, the output 59 is connected by a 68 ohm resistor 63 to the non-inverting input 64 of a third operational amplifier 66. Positive feedback is provided by a 51,000 ohm resistor 67 connected between the output 68 and the non-inverting input 64 of the third operational amplifier 66. In this embodiment, it is preferable that the temperature differential comparator unit 14 produce a hysteresis type of "High" or "Low" switching output, and the value of resistors 67 and 63 have been chosen accordingly, by means well known in the prior art. That is, the temperature differential comparator unit 14 will switch on at a higher temperature than the ideal trip point temperature and will switch off at a lower temperature than the ideal trip point temperature. In this embodiment, it has been found that a variance of plus or minus one-half a degree operates satisfactorily. The purpose of this is to accomodate the slowly changing temperatures being monitored. If the device were to respond instantly everytime the temperature reached the trip point, operation would not be significantly improved, and the wear and tear on the load unit 18 would reduce the operable life thereof. The inverting input 69 is connected to the reference unit 16, which unit 16 will now be described.

The reference unit 16 includes generally a plurality of resistors 71 connected in series with an electrically accessible tap node 72 between each resistor 71 pair, such as might be found in a resistive rotary switch. One end 73 of the reference unit 16 is grounded, and the end opposite 74 is connected to the −5 volt source 33 through a third variable resistor 76 that is used for calibration. Two capacitors 77 are connected in parallel between the −5 volt source 33 and ground potential 36. The operation of the reference unit 16 in conjunction with the temperature differential comparator unit 14 is described more fully below.

The output 68 of the temperature differential comparator unit 14 is connected by a 680 ohm resistor 78 to the base 79 of a first transistor 81, the emitter 82 of which is grounded and the collector 83 of which is connected to the load isolation unit 17.

Figure 3:
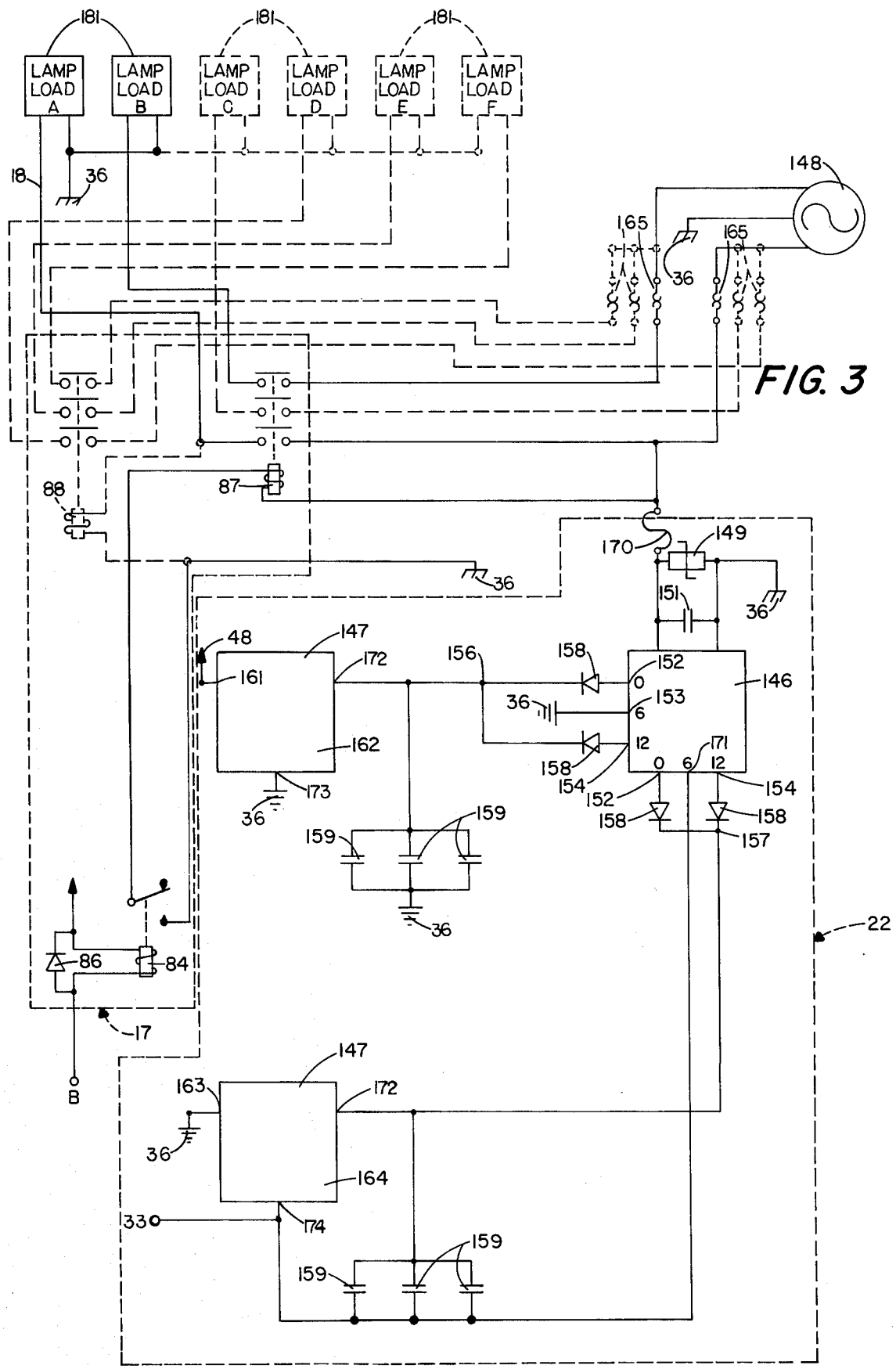
FIG. 3 is a partial schematic view of the device detailing the load isolation unit, the load unit and the power supply.

Referring to FIG. 3, the load isolation unit 17 includes an isolation relay switch 84 connected in parallel with a diode 86. The isolation relay switch 84 is operably connected to a second relay switch circuit 87, which second relay 87 is operably connected to the load unit 18.

The load unit 18 is formed here of a plurality of load lamps 181. The laod lamps 181 are grouped and limited to no more than five lamps 181 in a group. Each group of load lamps 181 is connected to separate poles on relay switch 87.

A third relay switch 88 may be installed in situations that require more load lamp groups than the relay switch 87 can accomodate. The relay switch 87 is electrically connected to activate the third relay switch 88 whenever the second relay switch 87 is electrically energized.

Circuit breakers 165 limit the current flowing through the relay switch contacts and the load lamp groups to twenty amperes maximum. Typical load lamp group current is fifteen amperes at the maximum number of lamps 181 per load lamp group. The operation of the above elements will be disclosed fully infra.

Figure 4:
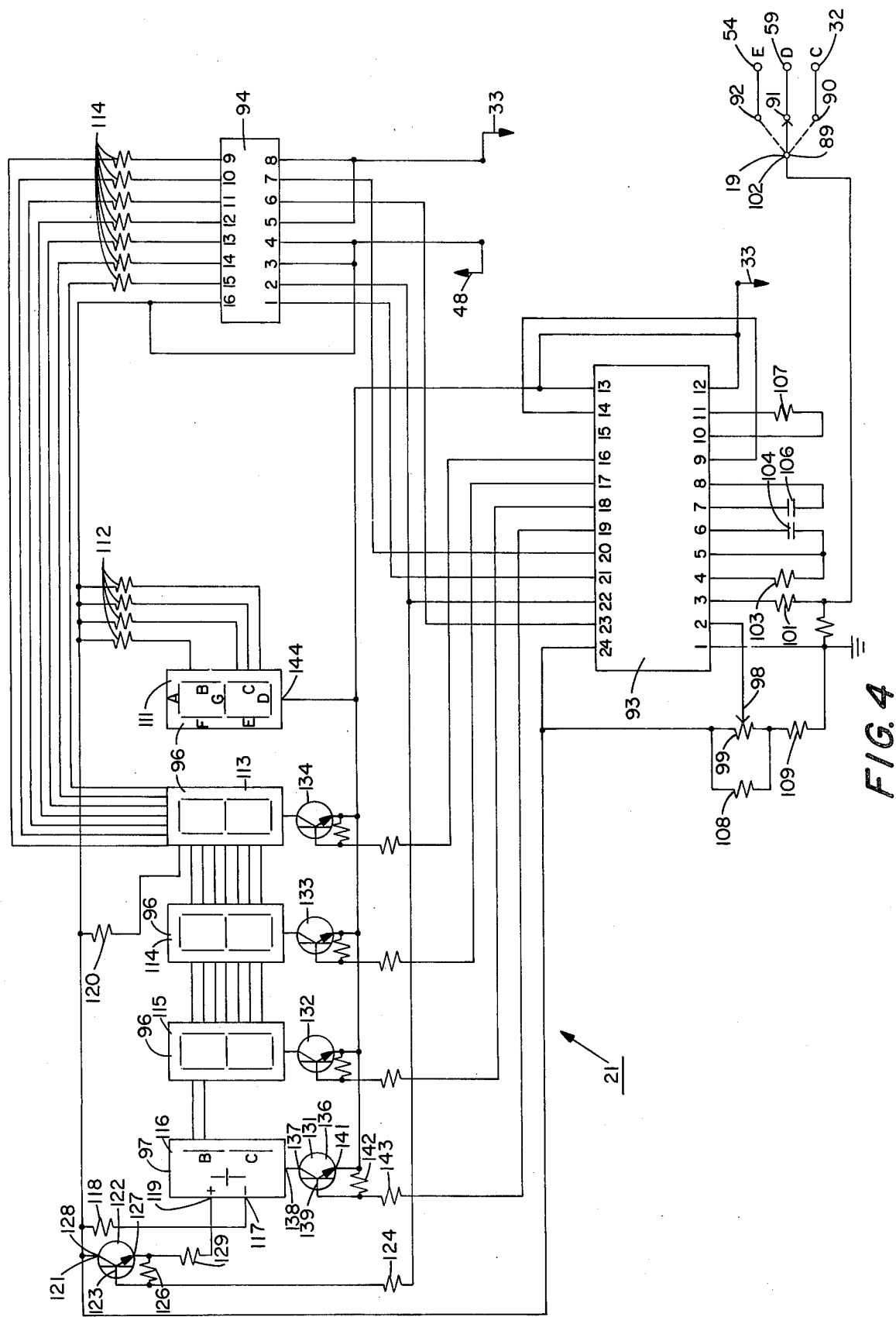
FIG. 4 is a partial schematic view of the device detailing the display switch and the display unit.

Referring to FIG. 4, a display unit 21 is connected to the output 32 and 54 of the ambient and exhaust heat sensors 11 and 12 and to the output 59 of the comparator unit 13 by a display switch 19. The display switch 19 includes a triple pole switch 89, the first pole 90 being attached to the output 32 of the ambient probe 11, the second pole 91 being attached to the output 59 of the comparator unit 13, and the third pole 92 being attached to the output 54 of the exhaust probe 12.

The display unit 21 includes generally an analog-to-digital convertor 93, a BCD-to-7 segment latch decoder/driver 94, four 7 segment display units 96, a half digit display unit 97 and a number of transistor driver circuits.

The analog-to-digital convertor 93 is typified here by a 24 pin MC 14433L analog-to-digital convertor, externally biased and compensated as follows: Pin 1 is grounded; pin 2 is connected to the tap lead 98 of a fourth variable resistor 99; pin 3 is connected by a 1 mega ohm resistor 101 to the common pole 102 of the display switch 19, pin 5 is connected to pin 4 by a 470,000 ohm resistor 103 and to pin 6 by a capacitor 104; pin 7 is connected to pin 8 by a capacitor 106; pin 9 is connected to pin 14; pin 10 is connected to pin 11 by a 300,000 ohm resistor 107; and pin 12 is connected to the −5 volt source 33. The fourth variable resistor 99 noted above is part of a three-resistor voltage divider, such that the fourth variable resistor 99 is connected in parallel with a 1,000 ohm resistor 108 between the +5 volt source 48 and a grounded 5,760 ohm resistor 109. The remaining pin connections for the analog-to-digital converter 93 will be disclosed further below.

The BCD-to-7 segment latch decoder/driver 94 is typified here by a 16 pin CD4511BC BCD-t-7 segment latch decoder/driver. The latch decoder/driver 94 is connected to the +5 volt source 48 at pins 3, 4 and 16, and to the −5 volt source 33 at pins 5 and 8. Digital signals from the digital-to-analog convertor 93 are directed to the BCD-to-7 segment latch decoder/driver 94 by connections between: pin 20 of the A-to-D convertor 93 and pin 7 of the BCD-to-7 segment latch decoder/driver 94; pin 21 of the A-to-D convertor 93 and pin 1 of the BCD-to-7 segment latch decoder/driver 94; pin 22 of the A-to-D convertor 93 and pin 2 of the DCD-to-7 segment latch decoder/driver 94; and pin 23 of the A-to-D convertor 93 and pin 6 of the BCD-to-7 segment latch decoder/driver 94. The output of the BCD-to-7 segment latch decoder/driver 94 is obtained at pins 9 through 15 inclusive, each of which pin operates independently of any other output pin. That is, the 7 segment convertor 94 provides 7 distinct and independent output signals, each signal being used thereafter to energize one segment of a 7 segment display unit 96. For convenience, it should be noted that each segment output is more commonly known in the art by an alphabetic designation; that is, pin 13 energizes the "a" segment, pin 12 the "b" segment, pin 11 the "c" segment, pin 10 the "d" segment, pin 9 the "e" segment, pin 15 the "f" segment and pin 14 the "g" segment. These designations will be used where appropriate below.

The display unit 21 of this embodiment contemplates the use of four 7 segment display units 96, and one half digit unit 97. Viewing the units 96 from the right to the left as observed in FIG. 4, the first display unit 111 has each of the "a", "e", "f", and "g" segments hardwired by separate 330 ohm resistors 112 to the +5 volt source 48. This results in the alphabetic character "F" being continuously displayed by the first unit 111, the "F" being an abbreviation for "Fahrenheit". The second display unit 113 is connected by seven 100 ohm resistors 114 to pins 9 through 15 inclusive of the 7 segment convertor 94, respectively. The "a" through "g" segment lines are thereafter operably connected between the second and third display units 113 and 114 and the third and fourth display units 114 and 115 by appropriate electrical connections. Only the "b" and "c" lines are connected between the fourth and fifth units 115 and 116, since the fifth unit 116 will always display either a "1" when the display temperature exceeds 99.9 degrees Fahrenheit, or no number at all. Additionally, the decimal point input of the second display unit is hardwired by a 330 ohm resistor 120. The minus-sign input 117 of the fifth unit 116 is hardwired to the +5 volt source 48 by 100 ohm resistor 118, and the plus-sign segments 119 are controlled by a transistor drive circuit described below.

The drive circuitry for the 7 segment display units 96 is provided by a number of transistor and resistor configurations. The first driver unit 121 energizes the plus-sign segments 119 of the fifth display unit 116. The unit 121 includes a transistor 122, the base 123 of which is connected to pin 22 of the analog-to-digital convertor 93 by a 3,300 ohm resistor 124. A 3,300 ohm resistor 126 connects the base 123 of this transistor 122 to the emitter 127 thereof. The collector 128 is connected to the +5 volt source 48. Finally, the first driver unit 121 is completed by connecting a 100 ohm resistor 129 between the emitter 127 of the transistor 122 and the plus-sign input 119 of the fifth display unit 116.

Since the second, third, fourth and fifth driver units 131, 132, 133 and 134 are identical, a description of the second 131 will serve to disclose the remaining three. The second driver unit 131 includes a transistor 136 having its collector 137 connected to the driving input 138 of the 2 segment display unit 97. The base 139 and emitter 141 thereof are connected by a 3,300 ohm resistor 142, and the base 139 is further connected by a second 3,300 ohm resistor 143 to the analog-to-digital convertor 93. Specifically, the second driver unit 131 is connected to pin 19 of the analog-to-digital convertor 93, the third driver unit 132 is connected to pin 18, the fourth driver unit 133 is connected to pin 17 and the fifth driver unit 124 is connected to pin 16. It should additionally be observed that the third driver unit 132 is operably attached to the fourth 7 segment display unit 115, the fourth driver unit 133 is operably attached to the third display unit 114 and the fifth driver unit 134 is operably attached to the second display unit 113. The emitters 141 of the transistors 136 in the second, third, fourth, and fifth driver units, 131, 132, 133 and 134 are connected both in common and to the driving input 144 of the first display unit 111, to pin 13 of the analog-to-digital convertor 93, and to the −5 volt source 33.

Referring back to FIG. 3, the power supply unit 22 will now be disclosed. The power supply unit 22 includes generally a bridge transformer 146 with a double tap secondary, and two 5 volt regulators 147. The input of the transformer 146 is connected between an AC source 148 by a fuse 170 and ground 36. A varistor 149 and a capacitor 151 are connected in parallel between the inputs of the transformer 146 to provide protective circuitry therefore. The double tap secondary includes two 0 volt outputs 152, two 6 volt outputs 153, and two 12 volt outputs 154. One 6 volt output 153 is connected to ground 36 and the other 6 volt output 171 is connected to the −5 volt source 33. The 0 volt 152 and 12 volt outputs 154 are paired, as shown 156 and 157, by connecting a diode 158 to each output 152 and 154 connecting the cathode ends in common for each output pair 156 and 157. The output from each diode pair 156 and 157 is then connected to separate 5 volt regulator 147, typified in this embodiment by LM340K-5's. The input 172 to the regulator 147 in both cases is filtered by three capacitors 159 connected in parallel between the input 158 and the common terminals 173 and 174 of regulators 162 and 164. The +5 volt source 48 is then obtained by connecting to the +5 volt output 161 of the first regulator 162. The −5 volt source 33 is obtained by connecting the regulator 164 output 163 to ground potential 36 and connecting to the common terminal 174 of the regulator 164.

Having described the above elements, the operation of the device 10 may now be described as follows. The exhaust probe 12 is placed in such a location as to be able to measure the temperature of the air exhausting out of the grain in a grain curing system. The ambient probe 11 is placed in such a location as to be able to measure the temperature of the ambient air. When the power supply unit 22 is activated, the device 10 is energized and the monitoring begins. Each resistor 71 in the reference unit 16 is of a value corresponding to a particular temperature differential. The reference unit 16 is set at whatever predetermined temperature differential the operator should desire, within the operating range of the unit 16. For grain curing purposes, the differential will usually be set at some point between two and twelve degrees Fahrenheit. The comparator unit 13 subtracts the ambient temperature from the exhaust temperature and transfers this differential to the temperative differential comparator unit 14, where the latter unit will compare that value with the reference figure. So long as the differential between the exhaust and ambient air remains above the trip level, there will be no output from the temperature differential comparator unit 13. Therefore, the load circuit 18 will not be activated. If the exhaust air becomes warmer, however, causing the temperature differential to become smaller the temperature differential comparator unit 14 will trigger the load switch transistor 81 and thereby trigger the relay switches 84 and 87. This will cause the air modificaton device, e.g., infrared emitters (lamps) to go on. The lamps cause the moisture in the air passing through the grain to be energized, so that the energized moisture attenuates free grain moisture causing it to leave the grain and therefore causes the grain to cool as the air picks up free moisture from the grain/air. This will cause an ultimate drop in the exhaust temperature. When the temperature differential returns to the desired value, the temperature differential comparator unit 14 will detect a desired differential between the actual temperature differential and the reference value, and the load switch transistor 81 will switch off. This will cause the lamps to be switched off.

The display unit 21 is provided to allow the operator a means of double-checking the operation of the device 10. The display switch 19 allows the operator to choose between the output of the ambient probe 11, the output of the exhaust probe 12, and the output of the comparator unit 13. This means the operator may display in degrees Fahrenheit the temperature of the ambient air, the temperature of the exhaust air or the temperature differential between the two. This is done by the conversion of the analog output of the above elements into a digital signal by use of the analog-to-digital convertor 93, and then routing the digital signal to a BCD-to-7 segment latch decoder/driver 94 so that the digital signal may be displayed on the 7 segment display units 96. The display units as disclosed herein will indicate a three and one-half digit read-out.

Thus, it may be seen that the device 10 above acts not only to provide constant monitoring of a specific temperature differential, and the control of lamp units to provide a control means over the temperature differential, but also to provide a digital read-out system that allows the display of the three critical temperatures involved in grain curing.

Figure 5:
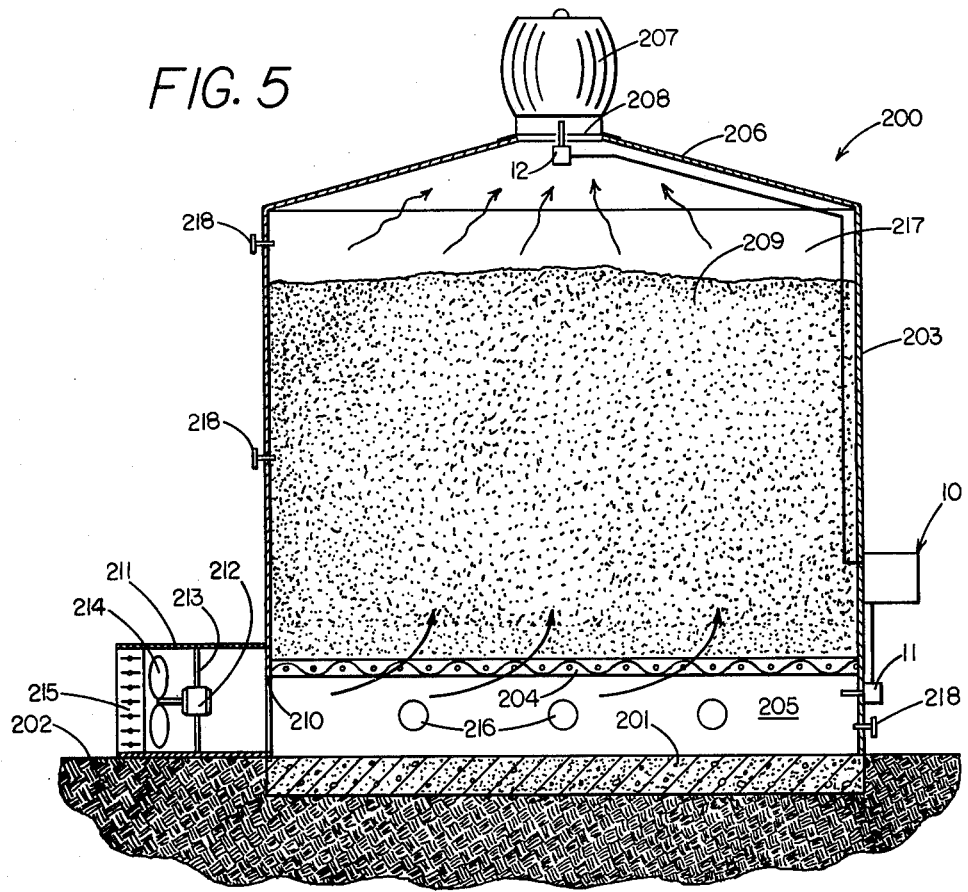
FIG. 5 is a cross sectional view of a grain bin structure utilizing the present invention.

Referring now to FIG. 5, a grain curing bin 200 is shown utilizing the apparatus of the present invention. The grain curing bin 200 includes a concrete base recessed into the ground 202. A circular upstanding sidewall 203 is attached to the concrete base 201.

An air pervious floor 204 is attached to the sidewalls 203 and is normally supported elsewhere in the plenum chamber 205 by supports not shown. The plenum chamber 205 spans the space between the concrete base 201 and the air pervious floor 204.

A roof 206 is attached to the top of the sidewalls 203 and a wind turbine type ventilator 207 is attached to the roof 206 at opening 208. Grain 209, such as corn, can be introduced into the bin 200 through the opening 208 when turbine ventilator 207 is removed, or a separate opening (not shown) in the roof 206 can be provided for this purpose.

An opening 210 is disposed in the sidewall 203 for introducing atmospheric air into the plenum chamber 205. A fan tube 211 is attached to the sidewall 203 encompassing the opening 210. A motor 212 is mounted within the fan tube 211 by the use of braces 213 and a fan blade 214 is operably connected to the motor and turns when the motor is running. A damper structure 215 is mounted in one end of the fan tube 211 for selectively opening or closing the end of the fan tube.

A plurality of infrared emitting heat lamps 216 are attached to the sidewalls 203 at a level below the floor 204 and are controlled by the apparatus shown in FIGS. 1-4. The control device 10 as shown in schematic form in FIG. 1 is mounted on the sidewall 203 as shown in FIG. 5. The ambient temperature sensor 11 is attached on the outside of the plenum chamber 205 on the bin wall 203 and protrudes through bin wall 203 to accurately sense the air temperature in the plenum chamber 205. The exhaust temperature sensor 12 is disposed within the bin 200 in the chamber 217 within an air exhaust opening 208 above the grain 209. The device 10 operates as described above to turn the infrared emitting lamps 216 on or off depending upon the temperature sensed at sensors 11 and 12.

Figure 6:
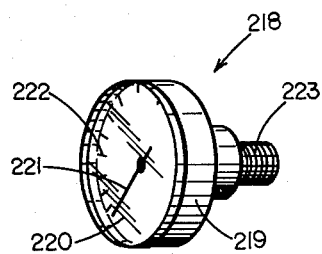
FIG. 6 is an enlarged perspective view of a pressure gauge as shown in FIG. 5.

Referring now to FIG. 6, a pressure sensing device 218 is shown. This particular pressure sensing and monitoring device is of a conventional type such as is commercially available from Marshalltown Gage Company of Marshalltown, Iowa. The gage has a housing 219, a clear face 220 to keep dirt away from the needle 221 and dial face 222. A threaded end 223 is provided to allow it to be screwed into a proper sized hole disposed in the sidewall 203 of a grain bin if desired.

Figure 7:
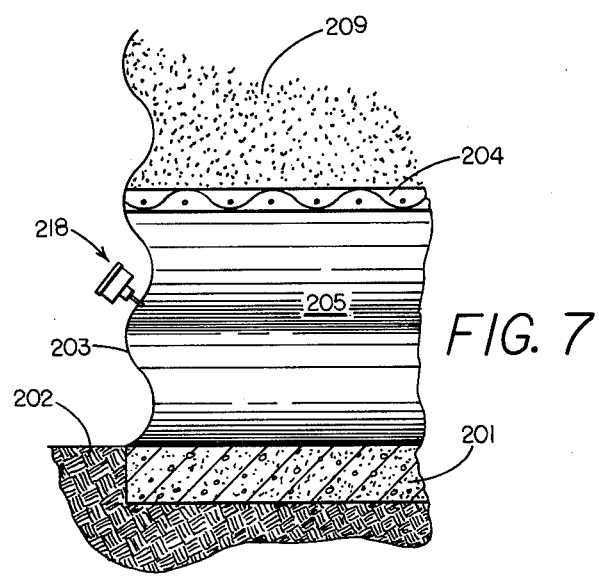
FIG. 7 is an enlarged detailed view of a pressure gauge installed in a corregated metal wall of a grain curing bin.

Referring to FIG. 7 it is noted that corregated sheet metal is used for the sidewall 203 as is conventional in the art. A hole is then drilled in the wall 203 and the gage 218 is manually rotated into the hole to the position shown in FIG. 7. Ideal positioning of the pressure gages 218 would be approximately as shown in FIG. 5, with one sensing the pressure in plenum chamber 205, one sensing the pressure within the bulk of grain 209, and one sensing the pressure in chamber 217.

A profile of air pressure on a grain bin is obtained by mounting pressure monitoring means on the binwall at varying levels so as to provide pressure differential information. These gages 218 are shown located on the binwall 203, as many as desired to provide complete pressure information. For example, to measure the pressure in a first environment such as in the plenum chamber 205 and in a second environment such as the grain chamber at 209 and use these readings to tell if the air is flowing through the grain properly.

These pressure gages 218 indicate whether the bin is filling safely, for example the presence of or lack of air blockages in the grain 209. Grain gives off water and heat as it cures. Sufficient air must pass through the grain to prevent an accumulation of this heat and moisture. The wetter the grain, the greater the release of heat and moisture will be. The warmer the grain, the greater the release of heat and moisture will be. The following table shows minimum air requirements.

| % Grain | Airflow | Pressure in inches of displacement of water |
|---|---|---|
| 27% corn | 4½ CFM/BU | 1 inch |
| 25% corn | 3 CFM/BU | 2 inches |

-continued

| % Grain | Airflow | Pressure in inches of displacement of water |
|---|---|---|
| 20% corn | 1 CFM/BU | 3 inches |

A warning sign on the gage 218 would be when such gage read 4 inches or more, which would mean that the airflow may be less than 1/5th CFM/BU.

The following would be signs of possible problems with the curing of the grain: 1. Persistent wet weather may reduce the normal rate of water removal and may cause condensation of water at the grain surfaces. 2. Sudden cold weather may cause temporary condensation to occur until the bin of grain is cooled. 3. Excessive damage to the grain causes channeling of air and higher air pressures. 4. Putting too many bushels of corn in a bin with too high of a moisture content will cause the grain to release moisture more rapidly than the air can remove it. All of the above four conditions may signal a gradual or sudden increase in pressure on gages 218 and thereby warn of potential problems. If the pressure on gages 218 increases then, for example, it means that it would not be wise to add more grain to the bin until the pressure has gone down, since as the pressure goes up, this means that the airflow has gone down. A lower pressure is therefore an indication of more airflow, more efficient drying and less consumption of electricity. Lower pressures also contribute towards cooler temperatures, which is a very desirable condition for curing grain.

It should be understood that the above disclosure describes only one possible embodiment of the invention, and that other materials and designs will readily occur to those skilled in the art without departing from the purview of the inventive penumbra disclosed herein. For instance, rather than converting the Kalvin values from the thermistor units to Fahrenheit values in each separate unit as disclosed above, it would be possible to use only a single conversion unit located after the display switch, and to recalibrate the reference unit accordingly.

We claim:

1. Apparatus comprising:

first sensing means for determining the temperature of a first environment and for producing an output voltage corresponding to such temperature said first sensing means including a first operational amplifier having an inverting input, a non-inverting input and an output, a first voltage transducer unit having an output voltage, and first, second, third and fourth resistors each having a first lead and a second lead, such that the first lead of said first resistor is electrically connected to the output of said first voltage transducer unit and the second lead of said first resistor is electrically connected to the inverting input of said first operational amplifier, the first lead of said second resistor is electrically connected to the inverting input of said first operational amplifier and the second lead of said second resistor is electrically connected to the output of said first operational amplifier, the first lead of said third resistor is electrically connected to the non-inverting input of said first operational amplifier and the second lead of said third resistor is electrically connected to ground potential, the first lead of said fourth resistor is electrically connected to the non-inverting input of said first operational amplifier and the second lead of said fourth resistor is electrically negatively biased;

second sensing means for determining the temperature of a second environment and for producing an output voltage corresponding to such temperature said second sensing means including a second operational amplifier having an inverting input, a non-inverting input and an output, a second voltage transducer unit having an output, a fifth, sixth, seventh, and eighth resistors each having a first lead and a second lead, such that the first lead of said fifth resistor is electrically connected to the output of said second voltage transducer unit and the second lead of said fifth resistor is electrically connected to the inverting input of said second operational amplifier, the first lead of said sixth resistor is electrically connected to the output of said second operational amplifier, the first lead of said seventh resistor is electrically connected to the non-inverting input of said second operational amplifier and the second lead of said seventh resistor is electrically connected to ground potential, the first lead of said eighth resistor is electrically connected to the non-inverting input of said second operational amplifier and the second lead of said eighth resistor is electrically negatively biased;

first comparator means operably connected to said first and second sensing means for comparing the voltage outputs therefrom and for producing an output voltage corresponding to the temperature differential between the first and second environment;

adjustable reference means for selectively providing an output voltage corresponding to a desired temperature differential;

second comparator means operably connected to said first comparator means and said adjustable reference means for comparing the voltage outputs therefrom and for producing a hysteresis type of "High" or "Low" switching output voltage corresponding to the difference between (a) the temperature differential between the first and second environment, and (b) the desired temperature differential;

a load switch for activating a load responsive to the "High" and "Low" voltage output of said second comparator means;

a display switch selectively and operably connected to the output of said first sensing means, the output of said second sensing means and the output of said first comparator means; and a display means operably connected to said display switch for producing a visual display of the temperature of the first environment, the temperature of the second environment and the temperature differential between the first and second environment, said display means including means for producing a visual display of the temperature in degrees Fahrenheit.

2. Apparatus as described in claim 1 wherein:

said first sensing means further includes a first variable resistor having a first lead, a second lead, and a tap lead, such that the first lead of said first variable resistor is electrically connected to the non-inverting input of said first operational amplifier, and the second lead and tap lead of said first variable resistor are electrically negatively biased; and said second sensing means further includes a second variable resistor having a first lead, a second lead, and a tap lead, such that the first lead of said second variable resistor is electrically connected to the non-inverting input of said second operational amplifier, and the second lead and tap lead of said second variable resistor are electrically negatively biased.

3. Apparatus as described in claim 2 wherein said first comparator means includes:
a third operational amplifier having an inverting input, a non-inverting input and an output;
ninth, tenth, eleventh and twelfth, resistors each having a first lead and a second lead, such that the first lead of said ninth resistor is electrically connected to the output of said first operational amplifier and the second lead of said ninth resistor is electrically connected to the inverting input of said third operational amplifier, the first lead of said tenth resistor is electrically connected to the output of said second operational amplifier and the second lead of said tenth resistor is electrically connected to the non-inverting input of said third operational amplifier, the first lead of the eleventh resistor is electrically connected to the non-inverting input of said third operational amplifier and the second lead of said eleventh resistor is electrically grounded, and the first lead of said twelfth resistor is electrically connected to the inverting input of said third operational amplifier and the second lead of said twelfth resistor is electrically connected to the output of said third operational amplifier.

4. Apparatus as described in claim 3 wherein said second comparator means includes:
a fourth operational amplifier having an inverting input, a non-inverting input and an output; and
thirteenth and fourteenth resistors, each having a first lead and a second lead, such that the first lead of said thirteenth resistor is electrically connected to the output of said fourth operational amplifier and the second lead of said thirteenth resistor is electrically connected to the non-inverting input of said fourth operational amplifier, and the first lead of said fourteenth resistor is electrically connected to the non-inverting input of said fourth operational amplifier and the second lead of said fourteenth resistor is electrically connected to the output of said third operational amplifier.

5. Apparatus as described in claim 4 wherein said adjustable reference means includes:
a reference switch having a first lead and a second lead wherein the first lead of said reference switch is electrically connected to the inverting input of said fourth operational amplifier;
a third variable resistor having a first lead, a second lead, and a tap lead; and
a plurality of resistors, such that the first lead and the tap lead of said third variable resistor are negatively biased and said plurality of resistors are serially connected between the second lead of said third variable resistor and ground potential with an electrically accessible junction point between each of said serially connected resistors, such that the second end of said reference switch is selectively electrically connectable to said junction points between said serially connected resistors.

6. Apparatus as described in claim 5 wherein said load switch includes:
a first transistor having an emitter, base and collector;
a first relay switch;
a second relay switch; and
a fifteenth resistor having a first lead and a second lead, such that the first lead of said fifteenth resistor is electrically connected to the output of said fourth operational amplifier and the second lead of said fifteenth resistor is electrically connected to the base of said first transistor, the emitter of said first transistor is grounded, and the collector of said first transistor is electrically connected to said first relay switch, which first relay switch is operably connected to said second relay switch, said second relay switch being operably connected to the load circuit.

7. Apparatus as described in claim 6 wherein said display means includes:
an analog-to-digital converter;
a BCD-TO-7 segment latch decoder/driver;
first, second, third and fourth 7 segment display units;
a half digit display unit; and
second, third, fourth, fifth and sixth transistors, such that said display switch is operably connected to said analog-to-digital converter, said analog-to-digital converter is operably connected to said BCD-TO-7 segment latch decoder/driver, said analog-to-digital converter is operably connected by said second transistor to said half digit display unit and by said third transistor to said first 7 segment display unit, said fourth transistor to said second 7 segment display unit and said fifth transistor to said third 7 segment display unit, and is further operably connected by said sixth transistor to said half digit display unit, whereby said analog-to-digital converter receives the analog voltage signal corresponding to a temperature and converts said signal into a digital signal, which digital signal is directed to and converted by the BCD-TO-7 segment latch decoder/driver unit into proper directing signals for controlling the 7 segment display units and the half digit display unit, such that the temperature corresponding to the analog voltage signal received by the analog-to-digital converter is displayed in digital numerical form by the half digit display unit and the 7 segment display units.

8. A method of using grain curing apparatus comprising first sensing means for determining the temperature of a first environment and for producing an output voltage corresponding to such temperature; second sensing means for determining the temperature of a second environment and for producing an output voltage corresponding to such temperature; first comparator means operably connected to said first and second sensing means for comparing the voltage outputs therefrom and for producing an output voltage corresponding to the temperature differential between the first and second environment; adjustable reference means for selectively providing an output voltage corresponding to a desired temperature differential; second comparator means operably connected to said first comparator means and said adjustable reference means for comparing the voltage outputs therefrom and for producing a hysteresis type of "High" or "Low" switching output voltage corresponding to the difference between (a) the temperature differential between the first and second environment, and (b) the desired temperature differential; and a load switch for activating a load responsive to the "High" or "Low" voltage output of said second comparator means; said method comprising the steps of:

monitoring the temperature of air in a first environment prior to its being introduced into the stored grain;

monitoring the temperature of air passing from grain in a second environment; and monitoring the temperature difference between the air in the first environment and the air in the second environment.

9. The method of claim 8 including;

modifying air in the stored grain in a bin by utilizing means for ventilating grain; and selectively operating the air modifying means in response to specified differentials of temperature.

10. The method of claim 9 wherein the air modification means includes the use of infra-red emitters.

11. The method of claim 9 wherein the air modification means includes means for the activation and deactivation of one or more ventilating means.

12. The method of claim 10 wherein the air modification means also includes means for the activation and deactivation of one or more ventilating means.

13. The method of claim 9 wherein the specified differentials of temperature correspond to the seasonal, mean wetbulb temperature depression.

14. The method of claim 9 further comprising:

monitoring the pressure of air in the first environment by use of a first pressure monitoring means.

15. The method of claim 13 further comprising:

monitoring the pressure of air in the second environment by use of a second pressure monitoring means and monitoring the pressure difference of air in the first and second environments.

* * * * *